United States Patent [19]

Scott

[11] 4,070,796

[45] Jan. 31, 1978

[54] METHOD OF PRODUCING ABRASIVE GRITS

[75] Inventor: John J. Scott, Niagara Falls, Canada

[73] Assignee: Norton Company, Worcester, Mass.

[21] Appl. No.: 212,614

[22] Filed: Dec. 27, 1971

[51] Int. Cl.$^2$ ............................................... C09C 3/04
[52] U.S. Cl. .................................. 51/309 R; 51/293; 264/332
[58] Field of Search ................ 51/293, 309, 308, 307; 264/5, 8, 9, 332

[56] References Cited

U.S. PATENT DOCUMENTS

| | | | |
|---|---|---|---|
| 918,069 | 4/1909 | Marius | 51/309 |
| 1,056,632 | 3/1913 | Croxton | 51/309 |
| 1,192,709 | 7/1916 | Tone | 51/309.1 |
| 3,128,165 | 4/1964 | Bridwell et al. | 51/309 |
| 3,137,751 | 6/1964 | Turnbull et al. | 51/309 |

Primary Examiner—Donald J. Arnold
Attorney, Agent, or Firm—Rufus M. Franklin

[57] ABSTRACT

Abrasive grits are prepared from molten oxide melt by pouring molten abrasive composition between plurality of spaced plates, made of heat resistant material such as graphite or metal to protect surface of molten abrasive from atmosphere and achieve rapid cooling. Abrasive is then comminuted by known methods to the desired grit sizes.

5 Claims, 3 Drawing Figures

METHOD OF PRODUCING ABRASIVE GRITS

BACKGROUND OF THE INVENTION

In order to produce a finely crystalline microstructure in abrasive grain it is known that the molten composition should be rapidly frozen. It has been conventional in the art to pour the molten abrasive on a heat resistant surface in the form of a thin slab, to pour into small molds, and to cast onto a cooled rotating cylindrical surface. Such prior art methods which result in the exposure of one surface to the atmosphere produce a product which includes a high degree of porosity at and adjacent such surface.

The present invention achieves the production, for comminution into abrasive grit sized particles, of thin slabs of abrasive oxide material having an extremely small crystal structure and minimizes the production of porous material.

SUMMARY OF THE INVENTION

These objectives are achieved by pouring the molten abrasive composition between a plurality of spaced metal or graphite plates spaced ½ inch or less apart, with the ratio of volume of plates to volume of space between plates being preferably at least about 3 to 1, depending upon the material being poured and the material of the plates. Lower ratios may be employed if supplemental cooling methods, such as internal water cooling or electrostatic cooling is employed or if reuse of the plates is not necessary.

The spaces in which the molten abrasive is poured should have a controlled maximum, and are conveniently uniform in thickness, but need not be planar or uniform in shape. A convenient and simple arrangement involves a plurality of flat plates mechanically held together in a frame and kept separated by spacers equal in thickness to the desired spacing between the plates.

Since the freezing of the molten abrasive proceeds from the face of each plate between which the material is poured, a line of separation is evident in the material, at its midpoint, where the solidification fronts meet. This is normally a plane of weakness in the material and thus requires that the plates be spaced apart the proper distance to maximize the yield of a specific desired grit size distribution.

The invention is particularly suitable for the new alloy type abrasives in which zirconia or other refractory oxides are co-fused with alumina, as illustrated in U.S. Pat. Nos. 3,181,939 and 3,498,769.

In a typical application of the invention, the spaced plates would be positioned under the pouring spout of a furnace and the interstices between the plates filled. The plates would then be allowed to cool sufficiently for safe handling and separated and the solidified abrasive removed and crushed by impact or rolls crushing or other conventional crushing technique, depending upon the particular grinding application for which the material is produced. A particular advantage of the present invention is the large yield of homogeneous finely crystalline usable abrasive produced upon crushing, as opposed to prior art cooling methods, since 95% or more of the surface of the abrasive in the mode is protected from the atmosphere by adjacent mold surface, and since the very rapid cooling results in extremely tough finely crystalline material.

DESCRIPTION OF PREFERRED EMBODIMENTS

EXAMPLE I

Figure 3:
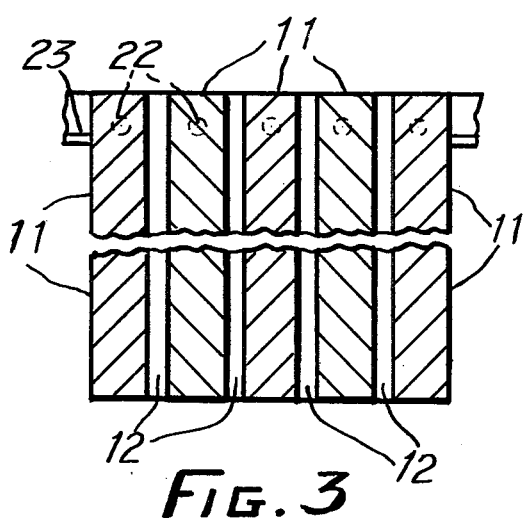
FIG. 3 is a vertical sectional view taken on section 3—3 of FIG. 2. The plates 11 may be of graphite or a metal such as steel, ductile iron, copper, or aluminum melting above 650° C and essentially non-reactive with the abrasive under the conditions of pouring. Although the melting point of the plates may be lower than the temperature of the molten abrasive, melting does not occur due to the rapid absorption and dissipation of heat by the plates.
Figure 2:
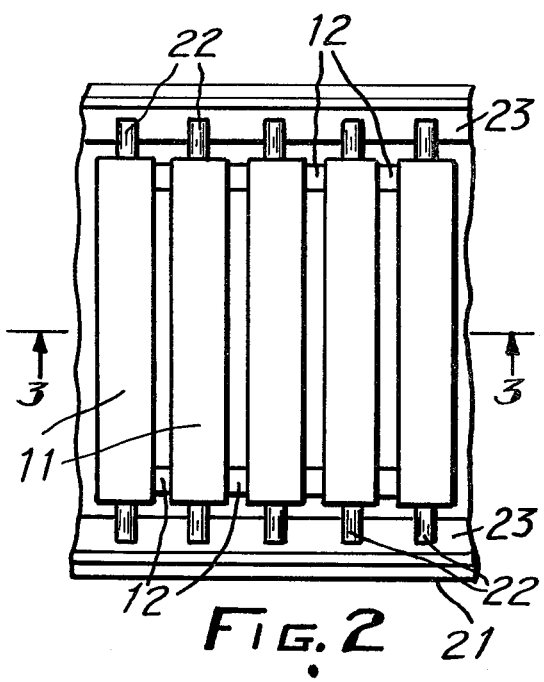
FIG. 2 is a top view of plates 11, showing spacer means 12 welded on one side only to the plates to permit disassembly of the mold for removal of the abrasive.
Figure 1:
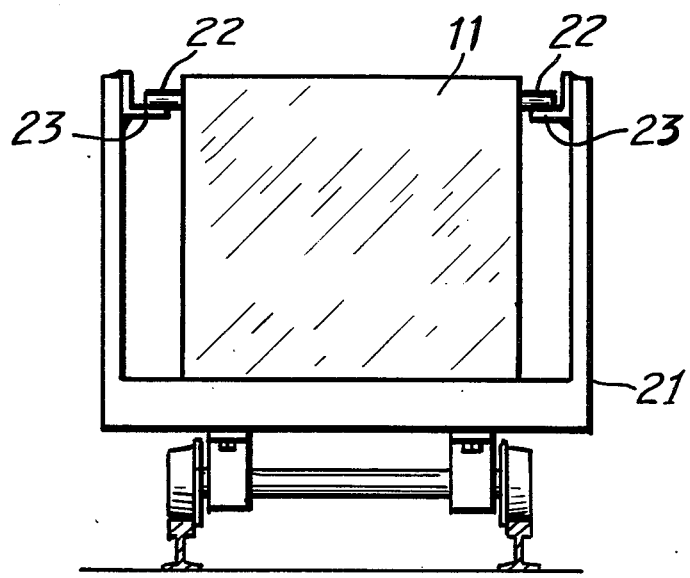
FIG. 1 is an end view of a mold (not to scale) consisting of a plurality of plates 11 supported on a car 21 by pins 22 resting on shelves 23.

A fusion of alumina containing 25% by weight of zirconia was prepared in a casting furnace, by the conventional electric arc fusion technique well known in the art.

The product was cast between steel plates ¼ inch in thickness and spaced 3/16 inch apart. The solidified product between the plates was collected, jaw crushed to ½ inch and finer lumps, then impact crushed. In the impact crushing operation all material passing through the standard 8 mesh (Tyler Screen: 8 meshes per lineal inch) screen and retained on the 24 mesh was collected, coarser material was recycled, and finer grits were separated. The yield of 8 to 24 mesh material was 67%, as compared to a 45% yield by prior art casting methods, while maintaining the same grain strength.

What is claimed is:

1. A method for the production of abrasive grain from molten abrasive comprising
    pouring said molten abrasive into a plurality of spaces defined by a plurality of relatively cold spaced parallel graphite or metal plates, the geometry of said spaces being such that at least 95% of the surface area of the poured abrasive in the mold is protected from the atmosphere by an adjacent mold surface during solidification, whereby the abrasive is solidified rapidly without melting of said plates, and
    separating the solidified abrasive from said plates and comminuting it.

2. A method according to claim 1 in which the plates are essentially non-reactive with the molten abrasive and have a melting point above 650° C.

3. A method as in claim 1 in which the plates are steel with a thickness of at least ½ inch.

4. A method as in claim 1 in which the volume of the plates is at least 3 times the volume of the spaces between said plates.

5. A process for producing an abrasive material which comprises the steps of melting abrasive material, providing a plurality of generally vertically arranged, relatively cold, metal or graphite plates which are held spaced apart between ¼ inch and 1/16 inch, to provide a plurality of thin sheetlike spaces between adjacent plates, pouring the molten abrasive material into the spaces between the plates to solidify the abrasive material essentially immediately, separating the plates, removing the solidified abrasive material from the plates, and crushing the abrasive material to grit sized grain.

* * * * *

UNITED STATES PATENT OFFICE
CERTIFICATE OF CORRECTION

Patent No. 4,070,796          Dated January 31, 1978

Inventor(s) John J. Scott

It is certified that error appears in the above-identified patent and that said Letters Patent are hereby corrected as shown below:

Column 2, line 25; " ¼ inch " should read - 3/4 inch -

Signed and Sealed this

Thirty-first Day of October 1978

[SEAL]

Attest:

RUTH C. MASON
*Attesting Officer*

DONALD W. BANNER
*Commissioner of Patents and Trademarks*